UNITED STATES PATENT OFFICE.

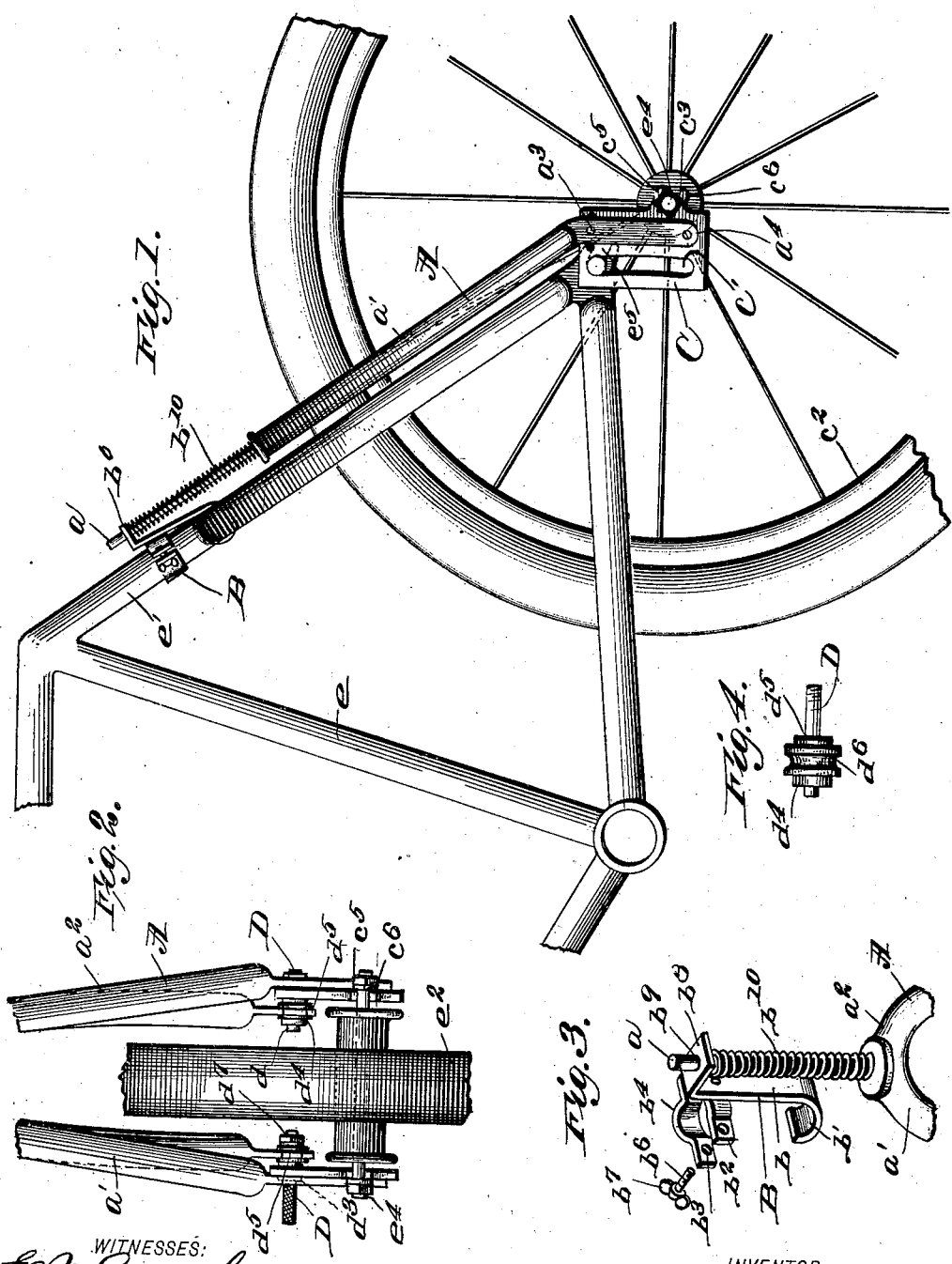

SAMUEL JUDSON TAYLOR, OF GRANTS PASS, OREGON, ASSIGNOR OF ONE-HALF TO WILLIAM A. PADDOCK, OF GRANTS PASS, OREGON.

BICYCLE ATTACHMENT.

No. 833,649.  Specification of Letters Patent.  Patented Oct. 16, 1906.

Application filed March 14, 1906. Serial No. 306,016.

*To all whom it may concern:*

Be it known that I, SAMUEL JUDSON TAYLOR, a citizen of the United States, and a resident of Grants Pass, in the county of Josephine and State of Oregon, have invented certain new and useful Improvements in Bicycle Attachments, of which the following is a specification.

My invention is an attachment for bicycles; and it consists in certain novel constructions and combinations of parts hereinafter described and claimed.

Referring to the drawings forming a part hereof, Figure 1 is a side elevation of a part of a bicycle provided with my improvements. Fig. 2 is a rear view of a part of Fig. 1. Fig. 3 is a detail perspective view of the securing-clamp. Fig. 4 is a detail view of the shaft connecting the plates and the bicycle-frame.

In the practical application of my invention I provide a supplemental rear fork A, comprising a body portion $a$ of relatively small diameter and arms $a'$ $a^2$ of relatively large diameter.

The body portion of the yoke is yieldingly connected to the rear fork $e'$ of the frame $e$ of the bicycle E by means of a clamp B.

The clamp B comprises a bar $b$, arranged longitudinally of the rear fork of the bicycle and provided at its lower end with a hook $b'$, engaging between the arms of the fork. The bar is provided with a fixed jaw $b^2$ and a movable jaw $b^4$, suitably curved to receive the body portion of the rear fork and connected together by set-screws $b^6$, traversing alined perforations $b^3$ $b^5$ in the fixed and movable jaw and provided with winged heads $b^7$. The upper end of the bar $b$ is provided with an angular portion $b^8$, having a perforation $b^9$, through which passes the upper end of the body portion of the yoke, and a coil-spring $b^{10}$ encircles the body portion between the said angular portion and the junction of the arms with the body portion. The lower ends of the arms $a'$ $a^2$ are bent at an angle and provided with perforations $a^3$ $a^4$.

Plates C, having curved slots $c'$ and a plurality of perforations $c^2$, are secured to the lower ends of the arms by the means of bolts and nuts $c^3$, traversing the perforations in the plates and the perforations in the arms. By engaging the upper bolt with different perforations of the plate the plates may be adjusted upon the arms to correspond with different-sized frames.

Shafts D, having heads $d^3$ and bodies $d$ provided with screw-threaded ends, are slidably mounted in the slots of the plates, the heads engaging the outer faces of the plates and the body portions traversing the slot of the plate and the open slot $e^5$ at the rear corner of the bicycle-frame.

Washers $d^4$ $d^5$ are secured to the body portions in spaced relation with each other, and between the washers is journaled a roller $d^6$, the said roller being received within the slots $e^5$ at the rear corner of the bicycle-frame, and nuts $d^7$, screwed upon the screw-threaded ends of the body portions of the shafts, secure the parts in their relative position.

The plates C are provided at their rear edges with spaced lugs $c^5$ $c^6$, forming an open slot in which is received the axle $e^4$ of the rear wheel $e^2$ of the bicycle.

It will be understood from the description that the rear corner of the frame is free to yield downwardly against the resistance of the coil-spring, the shaft D making a sliding connection between the rear corner of the frame and the plates.

My improvement is especially adapted for attachment to ordinary bicycles, thus making a cushion-frame without change in the frame proper.

My improvement does not weaken the frame proper and will add but little to the weight of the bicycle and can be attached to any chain-bicycle. It can be put on or taken off whenever desired and requires no alteration whatever in the original frame.

The curved slots $c'$ of the plates C are formed upon the arc of a circle having the crank-shaft as its center in order to permit the adjustment of the plates without shortening or lengthening the chain.

Having thus described my invention, what I claim as new, and desire to secure by Letters Patent, is—

1. An attachment for bicycles comprising a fork having a body portion of relatively small diameter, a clamp for attachment to the rear fork of the frame, and having an opening to receive the body portion, a spring encircling the body portion between the junction of the arms therewith and the clamp, the arms of the fork being of relatively large diameter, and having the lower ends bent at an angle, plates having curved slots adjustably connected with the angular portions of the arms, a shaft engaging the slots and movable therein, a roller journaled on the shaft, said roller being received in the slots at the rear corner of the bicycle-frame, and means on the plates for engaging the axle of the rear wheel.

2. The combination in a bicycle, of a supplementary rear fork having a body portion of relatively small diameter, a clamp for attaching the body portion to the rear fork of the bicycle and comprising a plate having a hook for engaging between the arms of the rear fork, a fixed and a movable jaw on the plate for engaging the body portion of the rear fork, and bolts and nuts for securing the movable jaw to the fixed jaw, the arms of the supplementary fork being of relatively large diameter and provided at their lower ends with angular portions, plates adjustably connected to the lower ends of the arms, a slidable connection between the plates and the rear corner of the frame, and means on the plates for engaging the axle of the rear wheel.

3. The combination in a bicycle, of a supplementary rear fork having a body portion and arms, means for yieldingly connecting the body portion of the supplementary fork to the rear fork of the bicycle-frame, plates having curved slots adjustably connected to the arms, near the lower ends thereof, a shaft movable in the slots, a roller journaled on the shaft between the plates, said roller being received in the slots in the rear corner of the bicycle-frame, and means on the plates for engaging the axle of the rear wheel of the bicycle.

SAMUEL JUDSON TAYLOR.

Witnesses:
  J. T. FRY,
  R. K. HACKETT.